Figure 1:
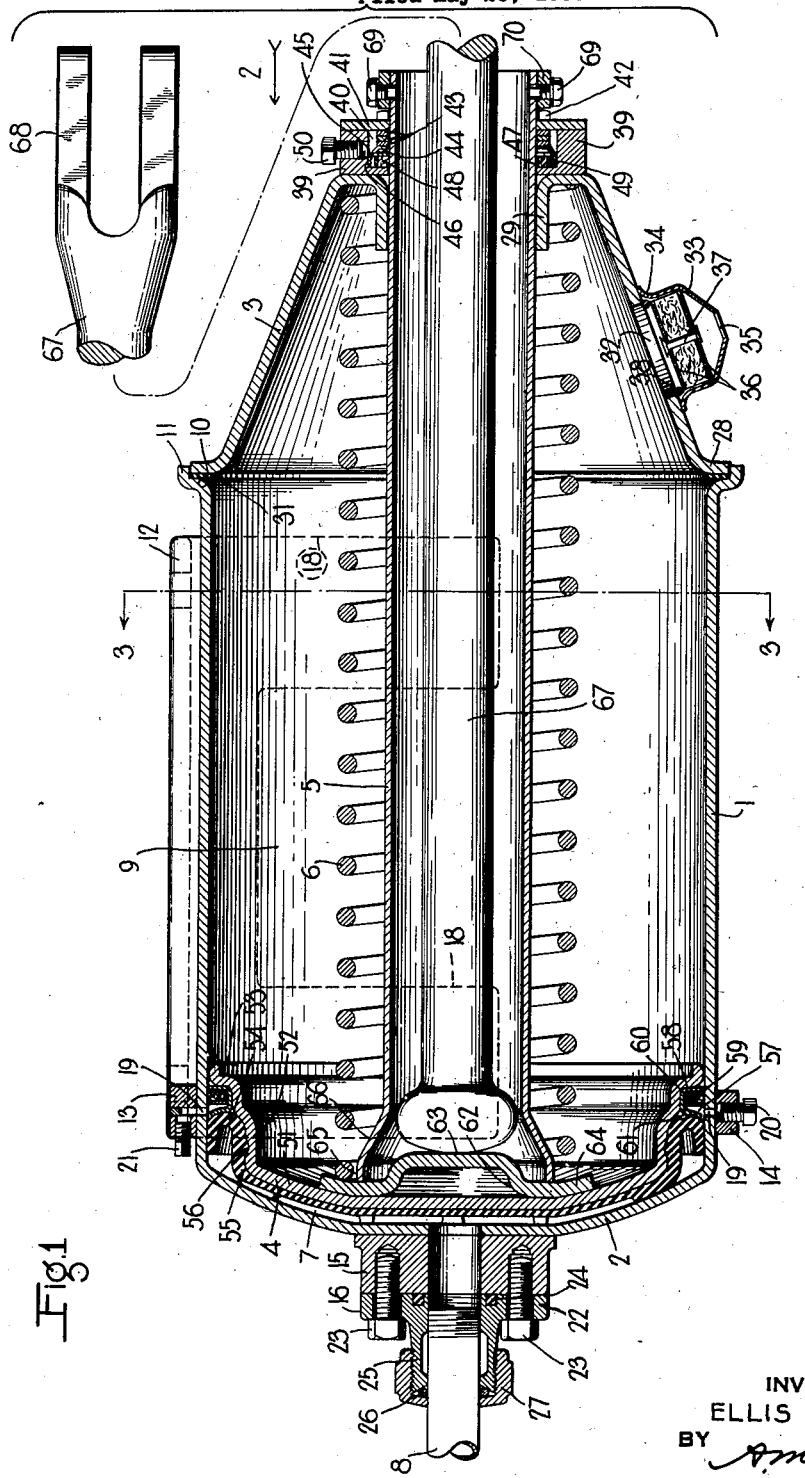

March 25, 1941. E. E. HEWITT 2,236,266
BRAKE CYLINDER
Filed May 20, 1938 2 Sheets-Sheet 1

INVENTOR
ELLIS E. HEWITT
BY
ATTORNEY

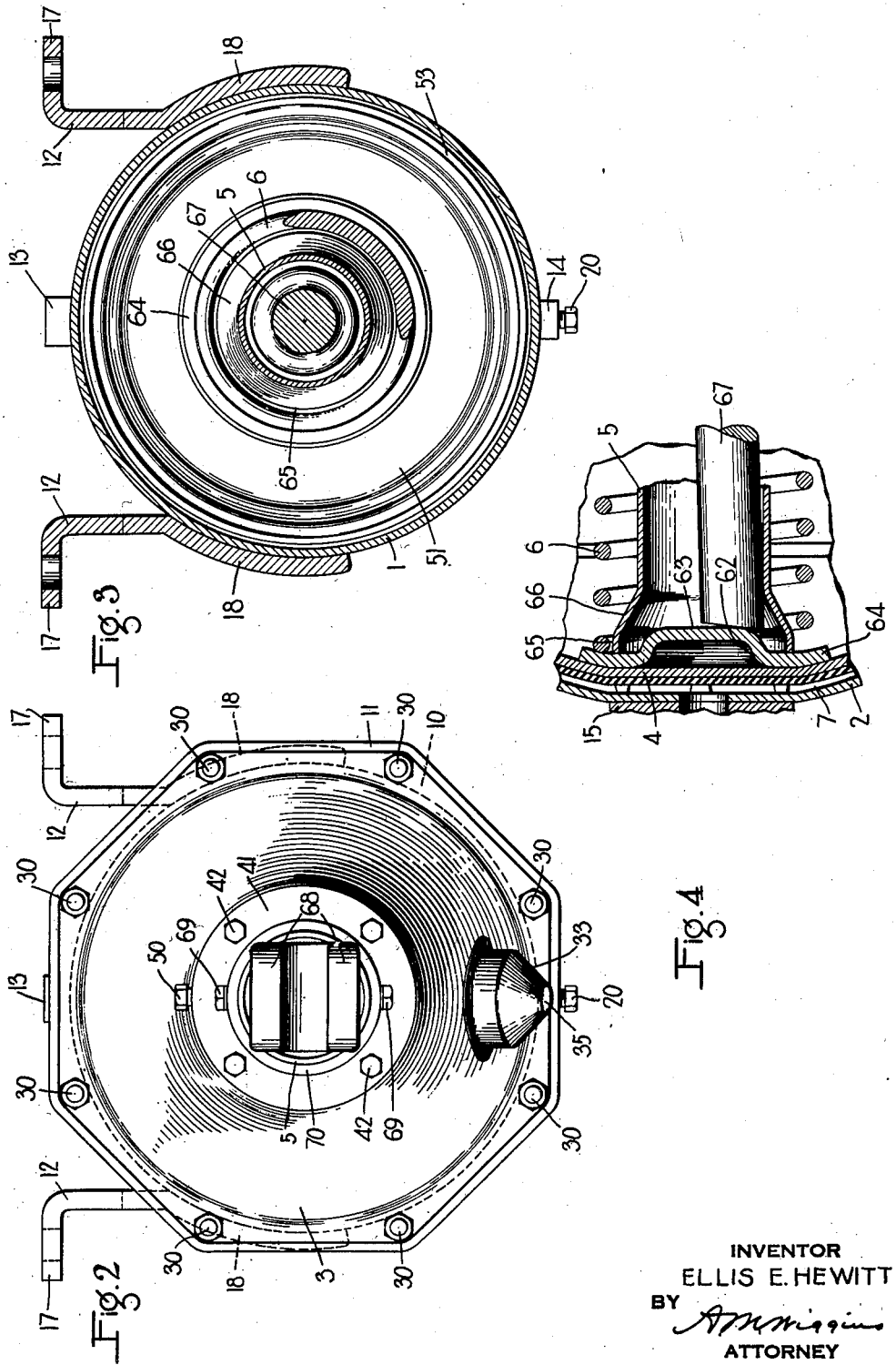

Patented Mar. 25, 1941

2,236,266

UNITED STATES PATENT OFFICE 2,236,266

BRAKE CYLINDER

Ellis E. Hewitt, Edgewood, Pa., assignor to The Westinghouse Air Brake Company, Wilmerding, Pa., a corporation of Pennsylvania Application May 20, 1938, Serial No. 209,024

2 Claims. (Cl. 309—2)

This invention relates to fluid pressure brakes and more particularly to brake cylinder devices such as are employed in connection therewith.

In order for railroads to meet present economic conditions it is becoming more and more essential for them to provide cheaper, faster and generally more efficient transportation not only for passengers but also for freight. One method of meeting these conditions is by the use of lighter weight vehicles which are less expensive to build and maintain, which will carry heavier loads for their weight than has been the practice in the past, and which are adapted to be operated in longer trains and at higher speeds than has ever been heretofore possible.

In order to safeguard these longer, lighter weight, higher speed trains, a new brake equipment has been developed embodying improved and new features which provide greater flexibility of train control and greater safety than ever before obtained. In the development of this new brake equipment the most modern design practices were employed, and in addition extended use was made of improved metals and alloys and improved means for and methods of manufacture, with the ultimate result that the new brake equipment was, considering its performance, produced at a relatively low cost, was comparatively light in weight and embodied both mechanical and safety improvements never attained before in similar apparatus.

The brake cylinder device is that part of a fluid pressure brake equipment which ultimately controls the forcing of brake shoes on railway vehicles into braking engagement with the wheels thereof for stopping the vehicle. The brake cylinder device is therefore subjected to very high pressures and has in the past been made in the form of relatively heavy, rugged castings so as to stand up and provide efficient control of the brakes on the vehicle for a long period of time.

In keeping with the trend toward lighter and cheaper railway vehicles it was heretofore proposed to substitute a light weight brake cylinder for the heavy cast one commonly used. Difficulties were however encountered in producing a light weight brake cylinder which would be both inexpensive and capable of withstanding the severe service to which it is subjected. As a consequence, such light weight brake cylinders as were proposed have been generally abandoned. Due to more or less continued study of this problem I have finally devised a brake cylinder which I believe fulfills all of the essential requirements.

The principal object of the present invention is therefore the provision of an improved brake cylinder device for use on railway vehicles which is relatively light in weight, cheap to manufacture, which is reliable in operation and which will last in use substantially as long as the cast type heretofore employed.

My improved brake cylinder device is fabricated mainly from sheet metal, the parts being so designed and arranged as to provide a device embodying all of the desired operating characteristics and which permits the use of improved manufacturing methods discovered after exhaustive and expensive research.

Other objects and advantages will be apparent from the following more detailed description of the invention.

In the accompanying drawings; Fig. 1 is a sectional view taken longitudinally through a brake cylinder device embodying the invention; Fig. 2 is an end view looking in the direction of the arrow indicated by the reference character 2 in Fig. 1; Fig. 3 is a sectional view taken on the line 3—3 in Fig. 1; and Fig. 4 is a fragmentary view of a portion of the brake cylinder piston shown in Fig. 1 and embodying a differently shaped element.

As shown in the drawings, the improved brake cylinder device comprises a hollow, relatively thin walled tubular casing 1, the bore at one end of which is closed by an integral pressure head 2. A non-pressure head 3 is removably secured to the casing over the opposite end of the bore, and slidably mounted in said casing between the heads 2 and 3 is a brake cylinder piston 4 having a hollow piston rod 5 slidably mounted in a suitable bore provided centrally through the non-pressure head 3. A release spring 6 encircling the rod 5 bears at one end on the non-pressure head 3 and at the opposite end on the piston 4 for urging said piston to its brake release position engaging the pressure head 2, as shown in Fig. 1.

A pressure chamber 7 is provided between piston 4 and the pressure head 2 and is connected to a pipe 8 through which fluid under pressure is adapted to be supplied to and released from said chamber in the usual manner for controlling the brakes on a vehicle.

When fluid under pressure is supplied to chamber 7 it is adapted to act on the left hand face of piston 4 for moving said piston against the opposing pressure of spring 6 from the release position shown in Fig. 1 of the drawings in a direction toward the right hand for applying the brake on a vehicle, while when fluid under pressure is vented from said pipe and thereby from chamber 7, the release spring 6 is adapted to return the piston 4 to its release position. A non-pressure chamber 9 is provided between the piston 4 and non-pressure head 3 and is in constant communication with the atmosphere through a breather opening which will be later described.

The brake cylinder casing 1 and pressure head 2 are integral, as above mentioned, and are formed by drawing from a single piece of sheet metal which is initially in the form of a flat disc. The casing 1 is thus initially drawn with an inside diameter which is slightly undersize and it is then subjected to an ironing process which consists in forcing a ram through the casing to the pressure head 2, the ram being of such diameter as to expand the casing sufficiently to provide the proper inside diameter for the brake cylinder device being made.

During the process of drawing, there is formed around the open end of the casing an outwardly flaring stop shoulder 10 the perimeter of which is octagonal in shape and surrounded by a centering lip 11, the purpose of which will be later described. It should however be noted that the shoulder 10 and lip 11 act to strengthen the casing 1 against distortion.

After the casing 1 is drawn and then ironed out as above described, there is secured to the outside of said casing by welding two oppositely disposed supporting brackets 12, two diametrically opposite lubricating bosses 13 and 14, and to the pressure head 2 there is also secured by welding the base portion 15 of a pipe fitting 16.

Each of the supporting brackets 12 is substantially U shaped and comprises a base portion having an out turned bolting flange 17 extending longitudinally of casing 1 and carried by two leg portions 18 which are secured to said casing adjacent the ends thereof; the leg portions of one bracket being secured to portions of the casing substantially diametrically opposite the portions of the casing to which the leg portions of the other bracket are secured.

The bolting flanges 17 are adapted to be rigidly secured to any desired part of a car for supporting the brake cylinder device in its operating condition and by securing the leg portions 18 of the brackets 12 to substantially diametrically opposite portions of the relatively thin walled brake cylinder casing 1 as above described, the forces applied to the casing 1 when the piston 4 is subjected to fluid pressure for applying the brakes is transferred to the supporting brackets through substantially diametrically opposite portions of the casing, thereby reducing to a minimum any tendency of said casing to twist relative to the bolting flanges 17 and thereby become distorted.

The two brackets 12 are also secured to casing 1 in such locations that one of the flat edges of the octagon shaped shoulder 10 at the non-pressure end of the casing will be parallel to the part of the car on which the brake cylinder is to be secured so as to thereby be able to mount the brake cylinder closer to said part of the car and also to maintain the leg portions 18 of the brackets as short as possible so as to hold to a minimum strains set up therein during braking.

The two diametrically opposite lubricating bosses 13 and 14 are secured by welding to the casing 1 adjacent the pressure head 2, the boss 13 being disposed midway between the bolting flanges 17. Each of the bosses 13 and 14 is provided with a bore which registers at one end with an aperture 19 provided through the casing 1.

The other end of the bore in boss 14 opens at the outer end of the boss and is threaded to receive a pipe plug 20, while the bore in the boss 13 is connected to a threaded aperture opening at the forward side of the boss and normally closed by a pipe plug 21. The precise location of apertures 19 will be later described.

The base portion 15 of the pipe fitting 16 is provided with a central bore which registers with an aperture through the pressure head 2 opening into the pressure chamber 7. A pipe support portion 22 of the pipe fitting 16 is adapted to be removably secured to the base portion 15 by bolts 23; a gasket 24 being interposed between said portions to prevent leakage. The portion 22 of the pipe fitting 16 is provided with a threaded bore, registering with the bore in the base portion 15 of the fitting, and in which there is secured by screw-threaded engagement one end of the brake cylinder pipe 8. The pipe 8 extends through an extended portion 25 of the pipe fitting 16 and is rigidly clamped in the end of said portion by an open ended ring 26 wedged against the exterior of the pipe by a jam nut 27 having screw-threaded engagement with the end of portion 25 of the fitting.

After the brackets 12, lubricating bosses 13 and 14 and the base portion 15 of the pipe fitting 16 are welded to the casing 1 and integral pressure head 2, the inner surface of said casing is buffed to size thereby removing any irregularities in said surface due to previous operations, so as to provide a smooth, true surface for engagement by the brake cylinder piston 4 as will be later brought out.

The non-pressure head 9 is drawn to shape and during such drawing, there is provided at the larger end an outturned flange 28 which is octagonal in shape and adapted to fit within the lip 11. At the opposite end of the non-pressure head there is provided during the drawing process an inturned centrally located sleeve like portion 29 having a central cylindrical opening through which the piston rod 5 is adapted to operate.

The flange 28 on the non-pressure head 3 is provided with apertures between each of the corners of the flange, while in the shoulder 10 on the casing there are provided aligned apertures, these apertures being provided to receive bolts 30 for securing the non-pressure head 3 to casing 1, a gasket 31 being interposed between the shoulder 10 and flange 28 for preventing leakage through the joint.

In one side of the non-pressure head 9 there is provided an aperture 32 and over this aperture there is secured to the outside of the casing an air strainer comprising an inverted cup shaped retainer 33 provided around its open end with a flange 34 which is welded to the non-pressure head. A breather opening 35 is provided centrally through the closed end of the retainer 33. Inserted through the aperture 32 into retainer 33 is a strainer unit comprising two perforated discs 36 having curled hair or any other desired straining material packed between them and secured in spaced relation by a rivet 37 or the like. It will be noted that the portion of the retainer 33 into which the discs 36 fit is cylindrical in shape so that the discs and straining material will have a tight fit around their peripheries with the retainer 33 to prevent leakage around the straining material between said discs. A snap ring 38 is interposed between the inner peripheral edge of aperture 32 and the adjacent disc 36 to hold the strainer in place.

The aperture 32 just described is provided to permit free passage of air into and out of the non-pressure chamber 9 upon reciprocation of piston 4 in the casing 1, while the strainer over said aperture is adapted to prevent dirt entering said chamber. It is desired that this strainer be always located at the lower side of the non-pressure head 3 in order to avoid, insofar as possible, the free entrance of dirt or moisture to the strainer and from thence into the non-pressure chamber 9. It is of course understood that the brake cylinder device may be applied to a vehicle with the bolting flanges 17 disposed above, below or at one side of the casing 1; however, with the regular octagonal shape of lip 11 and flange 28 on the non-pressure head 3, the non-pressure head may always be applied to the casing with the strainer disposed below the non-pressure head, regardless of the mounting of casing 1.

An annular member 39 encircling the hollow piston rod 5 is secured to the outer end of the non-pressure head 9 by welding and is provided in its outer face with an annular recess 40 open to said rod. An annular perforated disc 41 encircling the rod 5 is removably secured by bolts 42 to the outer face of member 39 for closing the outer end of recess 40.

In recess 40 there are disposed adjacent the disc 41 and encircling and engaging the periphery of the rod 5 three scraper rings 43 for preventing dirt entering the non-pressure chamber 3 along said rod. The disc 41 holds the rings 43 against movement in one direction while said rings are held against movement in the opposite direction by spaced projections 44 on a ring 45 having a cylindrical portion 46 engaging the side wall of recess 40. The ring 45 also has spaced inwardly extending projections 47 between which and the bottom of the recess 40 is disposed an annular felt ring or swab 48. Surrounding the swab 48 and engaging the outer cylindrical surface thereof is a ring 49 for holding the swab in contact with the rod 5.

The annular member 39 is provided in its topmost portion with a threaded opening leading to recess 40 and normally closed by a plug 50. Through this opening lubricant is adapted to be forced into recess 40 for lubricating the bearing between the rod 5 and rings 43 and between said rod and the sleevelike portion 29 of the non-pressure head. The felt ring 48 is adapted to spread the lubricant on the rod 5 and to absorb a portion of the lubricant supplied to the recess 40 for maintaining the rod lubricated for a considerable period of time.

The brake cylinder piston 4 comprises an imperforate head portion 51 pressed from sheet metal into the form of a cup the central portion of which conforms substantially to the contour of the inner surface of the pressure head 2. The central portion of the piston head 51 merges into a cylindrical portion 52 which in turn merges into a cylindrical guide portion 53 adapted to slidably engage the inner wall of casing 1 for supporting the piston 4.

The cylindrical portion 52 of piston 4 is of smaller diameter than the inside bore of the casing 1 and in the space between said portion and casing there is disposed an annular U shaped portion 54 of a packing cup 55. The outer annular leg of the portion 54 of the packing cup slidably engages the inner wall of the casing for preventing leakage of fluid under pressure past the piston, while the inner annular leg of said portion of the cup is joined to a central disclike portion of the cup which completely covers the central portion of the piston head 51. The portion 54 of the packing cup is provided on the outer surface of the inner leg with an annular bead 56 contracted into a correspondingly shaped recess in the cylindrical portion 52 of the head for holding the packing cup in place on the head.

Between the back of the U shaped portion 54 of the packing cup and the cylindrical portion 53 of the piston head there is provided an annular space 57 in which there is disposed a U shaped annular metal ring 58 which carries a felt ring 59 and within said felt ring there is provided an expander ring 60 for urging the felt ring into contact with the wall of the casing 1. The ring 58 is secured to an annular member 61 bearing at one side on the cylindrical portion 53 of the piston head and at the other side on the back of the U shaped portion 54 of the packing cup.

The space 57 on the packing cup side of the felt ring 53 is adapted to register with the lubricating apertures 19 through the casing 1 when the brake cylinder piston 4 is in its release position as shown in the drawings, whereby with either one or the other of the pipe plugs 20 or 21 removed, lubricant may be forced into said space after which the pipe plug is replaced. Lubricant is thus supplied to space 57 for lubricating the bearing between the piston 4 and casing 1. The felt ring 53 acts to distribute the lubricant on the wall of the casing and also absorbs a certain amount for maintaining said wall lubricated for a considerable period of time.

An annular strengthening element 62 pressed from sheet metal to provide a central, raised domelike portion 63 surrounded by a flange 64 is secured axially to the rear or low pressure face of the piston head 51 by welding said flange to said head.

The inner end portion of the hollow piston rod 5 is expanded to provide at the end of the rod a substantially cylindrical end portion 65 joined to the main portion of the rod by a flaring portion 66 and welded to the element 62 in concentric relation to the central raised portion 63 of said element.

The piston release spring 6 surrounds the end portion 65 of the piston rod 5 and the end of said spring bears against the flange 64 of the strengthening element 62, the diameter of said end portion of the rod being such as to support the end of the spring in substantial axial relation with the brake cylinder piston 4.

The raised dome like portion 63 of the strengthening element 62 protrudes into the inner end of the hollow piston rod 5 and is provided for engagement by the inner end of the usual solid push rod 67 which is of smaller diameter than the bore in the hollow push rod 5 and which is usually provided at its outer end with a yoke 68 for connection with the brake rigging on a vehicle.

The dome like portion 63 of the strengthening element 62 not only makes said element and in turn the piston head 51 more rigid to resist distortion by fluid pressure supplied to chamber 7 for acting on the piston 4, but it is also provided to space the inner end of the push rod 67 a predetermined distance from the pressure head 2, when the brake cylinder piston 4 is in release position, which corresponds to the spacing provided in the conventional type of cast brake cylinder device and which is essential for properly locating the yoke 68 with respect to other parts of the brake mechanism on a vehicle.

The end of the raised dome like portion 63 of the strengthening element 62 is substantially flat in order that the engaging end of the push rod 67 will not shift radially thereon when subjected to pressure.

At times the push rod 67, instead of being provided with a ball-like end for engagement with the strengthening element 62, as shown in Fig. 1, is manufactured with a more or less uniform cross-section of smaller diameter than the ball-like end and of greater length than required for use, and then at the time an equipment is installed on a vehicle, the push rod is cut off to the proper length. The diameter of the dome like portion 63 of the strengthening element 62 is made sufficiently large to prevent the ends of such push rods wedging in between the side of the dome and the adjacent portion of the piston rod 5.

When push rods 67 are cut off as just described the cut ends are not always square, but at times may be tapered as illustrated in Fig. 4, and such tapered ends would, of course, amplify the wedging action above described. However, the portion 63 of the strengthening element 62 is made sufficiently large in diameter, and said element and the rod 5 are sufficiently strong to prevent the push rod, even though cut wedge shaped, from entering the space between the periphery of said element and said rod.

Secured to the outer end of the piston rod 5 by set screws 69 is the usual retaining ring 70. This ring is provided for holding the non-pressure head 3 assembled on the rod 5 against the pressure of release spring 6, when the bolts 30 securing the non-pressure head to casing 1 are removed, whereby the piston 4, rod 5, release spring 6 and non-pressure head 3 may be removed from and reapplied to the casing 1, as a unit, when it is desired to inspect the interior of the casing and parts therein or renew such parts.

A brake cylinder device of the design above described has been rendered possible and successful commercially only due to improvements that have been discovered and developed in the arts of drawing and welding metals. For instance, while the strainer retainer 33 is welded to the non-pressure head 3 by the well known spot welding process, the other parts of the brake cylinder device welded in place are welded by what is known as projection welding which consists in the provision on one of the parts to be welded of a relatively small raised portion in the form of a bead or spaced projections which are pressed against the other part to be welded and at the same time electric current is passed through the contact thus made for melting the contacting surfaces. Pressure is maintained between the parts while this melting of metals continues until the two parts are brought into intimate relation at which time the electric current is cut off. This projection method of welding provides a very strong joint and one which is quickly and readily made in contrast to the older relatively slow processes of welding.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake cylinder device comprising a sheet steel tubular casing, a sheet steel pressure head at one end of said casing, a non-pressure head formed of sheet steel secured to the opposite end of said casing, an annular outwardly extending flange provided on each of the adjacent ends of said casing and non-pressure head, the perimeter of each of the two flanges being polygonal in shape, a lip projecting from the perimeter of one of said flanges over the other of said flanges providing a recess for receiving the said other flange for centering said non-pressure head with said casing, a pair of oppositely disposed mounting brackets for said brake cylinder device secured to opposite sides of said casing, each of said brackets having a bolting flange and a mounting surface on said flange, the mounting surface of the two flanges being included in a plane extending parallel to the axis of said casing and parallel to one of the flat sides of the perimeter of the flange on said casing, a lubricating boss secured to said casing adjacent said pressure head and within a space between said brackets and said plane, another lubricating boss secured to a substantially diametrically opposite portion of said casing, each of said bosses and said casing having cooperating passageways for conveying lubricant to the interior of said casing, and a removable plug secured to each boss for closing the passageway therein.

2. A brake cylinder device comprising a sheet steel tubular casing, a sheet steel pressure head at one end of said casing, a non-pressure head formed of sheet steel secured to the opposite end of said casing, an annular outwardly extending flange provided on each of the adjacent ends of said casing and non-pressure head, the perimeter of each of the two flanges being polygonal in shape, a lip projecting from the perimeter of one of said flanges over the other of said flanges providing a recess for receiving the said other flange for centering said non-pressure head with said casing, a pair of oppositely disposed mounting brackets for said brake cylinder device secured to opposite sides of said casing, each of said brackets having a bolting flange and a mounting surface on said flange, the mounting surfaces of the two flanges being included in a plane extending parallel to the axis of said casing and parallel to one of the flat sides of the perimeter of the flange on said casing, said non-pressure head having a breather opening connecting the interior thereof and of said casing with the atmosphere, said breather opening being located between the ends of the non-pressure head and being bisected by a line extending through the non-pressure head at right angles to and bisecting one of the sides of the perimeter of the non-pressure head, and an air cleaning device secured to said non-pressure head over said breather opening for cleaning the air supplied from the atmosphere to the interior of said non-pressure head and casing.

ELLIS E. HEWITT.